C. E. REDDIG.
STARTING MECHANISM FOR EXPLOSIVE ENGINES.
APPLICATION FILED JULY 31, 1908.
959,070.
Patented May 24, 1910.
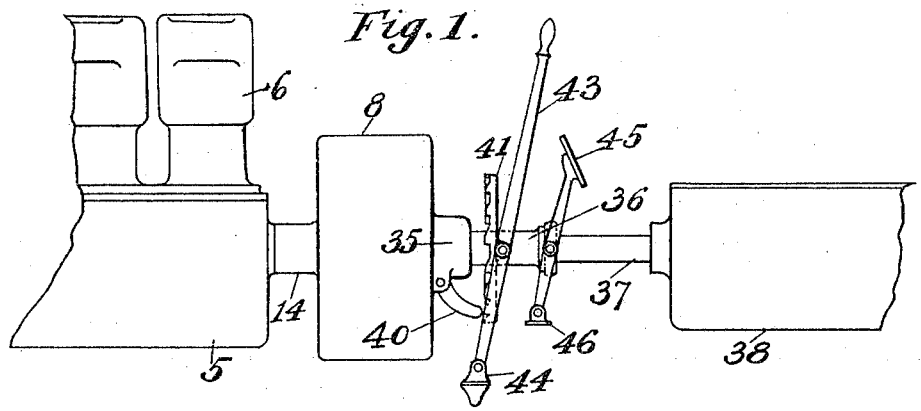
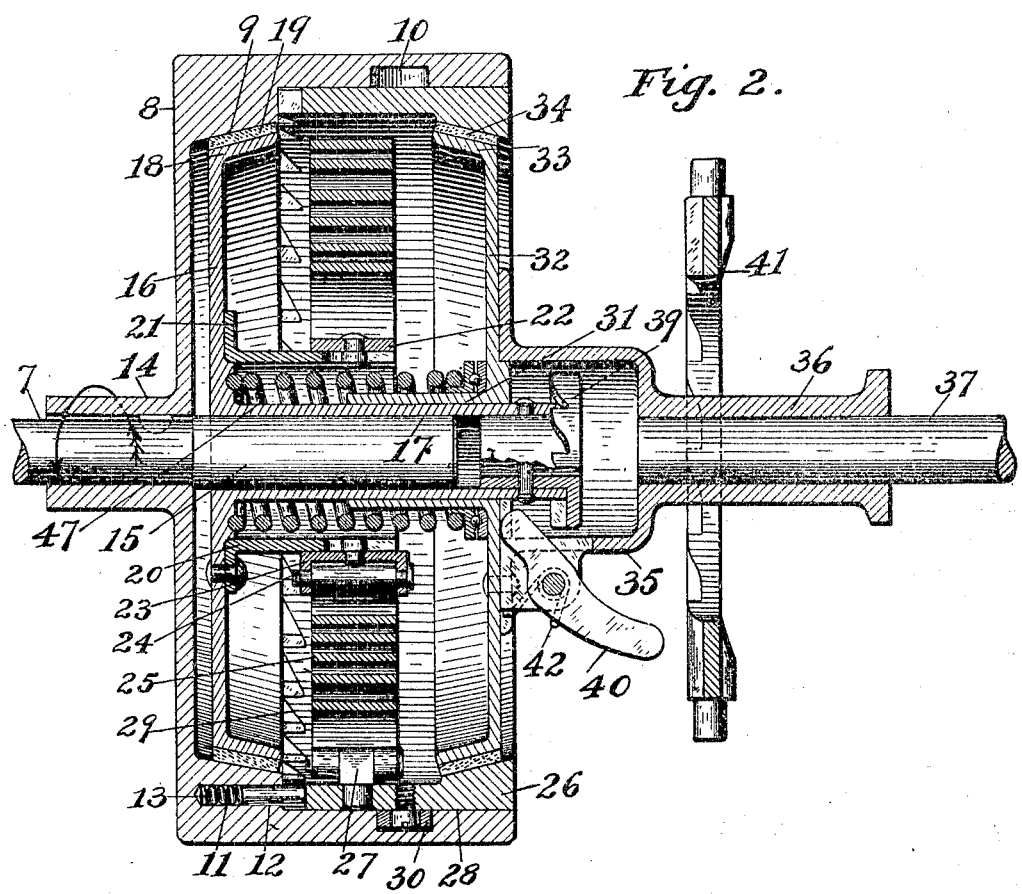
WITNESSES:
INVENTOR.
Charles E. Reddig.
BY
Arthur B. Jenkins
ATTORNEY.

UNITED STATES PATENT OFFICE.

CHARLES E. REDDIG, OF HARTFORD, CONNECTICUT.

STARTING MECHANISM FOR EXPLOSIVE-ENGINES.

959,070.  Specification of Letters Patent.   Patented May 24, 1910.

Application filed July 31, 1908. Serial No. 446,254.

*To all whom it may concern:*

Be it known that I, CHARLES E. REDDIG, a citizen of the United States, and a resident of Hartford, in the county of Hartford and State of Connecticut, have invented a new and Improved Starting Mechanism for Explosive-Engines, of which the following is a specification.

My invention relates to the class of devices for mechanically starting an explosive engine, and the object of the invention is to provide a device of this class having numerous features of advantage and utility. A form of device in the use of which these objects may be attained is illustrated in the accompanying drawings, in which—

Figure 1 is a diagrammatic view illustrating the position and manner of operation of a device embodying my invention. Fig. 2 is a detail view on enlarged scale in central longitudinal section through a structure embodying my invention.

In the accompanying drawings the numeral 5 denotes an engine base arranged to be suitably mounted on a vehicle (not shown) an engine 6 being suitably supported on the base. The crank shaft 7 of the engine is rotatably mounted in the base and a drum 8 is supported upon and secured to the crank shaft to rotate therewith, the direction of rotation being indicated by the arrow in Fig. 2 of the drawings. This drum incloses the starting mechanism and the main clutch, forming a case for such parts. The drum is formed to constitute one member of a starting clutch, the inner surface being beveled as at 9 to coöperate with the other member of the starting clutch to be hereinafter described, and the drum has also on its inner surface a guide groove 10 extending around the inner surface of the drum. A recess 11 is formed in the inner wall of the drum for the reception of a ratchet pin 12 seated on a spring 13. A single ratchet pin only is shown and described herein, but any number of such pins may be employed as desired. The drum has a hub 14 through which the crank shaft 7 extends, the latter being preferably enlarged as at 15, forming a shoulder against which the drum seats.

One member of the starting clutch is mounted within the drum upon the enlarged portion 15 of the crank shaft, this member constituting a reciprocating part of the clutch. This reciprocating starting clutch member includes a disk 16 having a sleeve 17 mounted upon but arranged to rotate independently of the crank shaft, and a flange 18 forming the contact portion of this member of the clutch. A shoe 19 of leather or like fibrous material may be located upon the flange to provide a frictional contact surface.

A collar 20 is secured to the disk 16 in any suitable manner, the means herein shown consisting of rivets passing through a lip 21 on the collar and through the disk, securing the parts together. An anchoring ring 22 is mounted for movement longitudinally upon the collar 20 as by means of studs on the ring engaging slots in the collar as shown in Fig. 2. A socket-piece 23 is located on the ring, having a socket in which an anchoring pin 24 is located. A winding spring 25 located within the drum has its inner end secured to the anchoring pin 24 and its outer end secured to the member 26 of a main clutch, a band 27 suitably securing the spring to the clutch member. The main clutch member 26 fits within an enlarged recess 28 in the drum 8, this clutch member being of ring form and having on its periphery ratchet teeth 29 arranged to engage the ratchet pin 12. Anti-friction collars 30 secured to the outer surface of the main clutch member 26, as by means of studs, are located in the guide groove 10. Any suitable number of these collars may be employed as required.

A reciprocating main clutch member is mounted for movement longitudinally upon the sleeve 17, this reciprocating main clutch member including in its construction a neck 31, disk 32, and flange 33, the latter being provided if desired with a shoe 34 of leather or other fibrous material forming a friction clutch surface.

A housing 35 is secured to the outer face of the disk 32, this housing having a neck 36 within which a connecting shaft 37 extends, said shaft connecting the crank shaft with the transmission gear mechanism located in the transmission gear case 38 and being splined or otherwise suitably connected with the neck of the said housing 35.

A toothed starting disk 39 is located on the end of the sleeve 17 within the housing 35, and starting levers 40 are pivoted to the housing, projecting through slots therein, the inner ends of the levers being adapted to engage the teeth on the starting disk and the outer ends of the levers to engage a toothed actuating disk 41. The levers are actuated in one direction by means of springs 42, any suitable number of the levers being employed, in the form herein shown and described three being employed for use, one only, however, being shown.

The actuating disk 41 is journaled in the side parts of a starting lever 43 which straddles the housing neck 36, this lever at its lower end being pivotally secured to a block 44. A main clutch actuating lever 45 arranged to be actuated by the foot is pivoted in the usual manner to a block 46, this lever engaging trunnions upon the housing neck 36, the lever being actuated in a manner common to motor vehicles for operating the main clutch.

A clutch actuating spring 47, in the form of a spiral spring, surrounds the sleeve 17 and neck 31, this spring thrusting against the disks 16 and 32, forcing them apart and tending normally to keep the clutch members of each of the clutches in engagement.

While I have shown and described herein the mechanism preferred by me as embodying my invention, I do not intend or desire to limit myself to the precise construction shown and described, as I contemplate various modifications and arrangements of mechanism which may be used without departing from the scope or intent of the invention.

The operation of the device is as follows: In the initial operation of the device the main or winding spring 25 being relaxed, the engine must be "cranked" in the ordinary manner to start it. As the crank shaft 7 rotates in the operation of the engine the drum 8 is rotated in the direction of the arrow shown in Fig. 2 of the drawings. The members of the starting clutch being in engagement are rotated, carrying the anchoring ring 22 and winding the main spring 25. While the main spring is being wound the other parts of the device are stationary, the ratchet pin 12 freely passing the ratchet teeth 29. When the spring has been wound the force of the crank shaft 7 is then imparted through the spring to the main clutch member 26, which is rotated, being held in place within the drum 8 by the collars 30 engaging but freely moving within the guide groove 10. The members of the main clutch being in engagement the connecting shaft 37 is operated to transmit the power to the traction mechanism in the usual manner, as through transmission gearing. The main clutch may be operated as by the foot or main clutch actuating lever 45 in the usual manner. When the engine is stopped the force of the spring in its effort to unwind is exerted upon the main clutch member 26, tending to rotate it in the direction indicated by the arrow in Fig. 2. This force is transmitted to the drum 8 through the ratchet teeth 29 and ratchet pin 12. The drum 8 is prevented from rotating, however, by reason of the engagement of the starting clutch, the force of the inner end of the spring upon the clutch and the outer end upon the drum through the connection above described being balanced. When it is desired to start the engine by the use of my improved starting mechanism the main clutch members will be disengaged, if not in that relation, and the lever 43 being operated to cause the actuating disk 41 to engage the levers 40, said levers are moved into engagement with the starting disk 39 and the latter moved to disengage the reciprocating member of the starting clutch from its coöperating member. The force of the spring at this time is prevented from exerting its influence upon the starting clutch member, as the latter is held from rotating by the starting levers which engage the teeth upon the starting disk 39 and also upon the actuating disk 41. The force of the spring is thus exerted upon the main clutch member 26, the teeth 29 of which engaging the ratchet pin 12 transmit the force of the drum 8 to rotate it in the direction of the arrow shown in Fig. 2, which movement rotates the crank shaft, causing compression and ignition of the gases within the cylinder to start the engine.

It will be noted that the drum 8 is of quite material size and weight, being so preferably constructed in order to embody the better form of mechanism, and when embodying such features it will be found readily to serve the double purpose of a fly wheel as well as a drum or clutch member, and when so constructed it will be found that a fly wheel, simply as such, may be dispensed with to advantage. It will also be noted that the drum 8 and the member 26 of the main clutch together constitute a casing in which is mounted the spring 25, the spring being connected at one end with one element, 26, of such casing and the starting clutch being interposed between the other end of the spring and the other element of the casing, and the two casing elements being connected by a backing ratchet device.

I claim:—

1. The combination of a driving shaft, a driven shaft, and gearing interposed between the said shafts comprising a two-part casing, one of which parts is connected with the driving shaft, a spring in the casing connected at one end to the other part of the casing, a starting clutch interposed between the other end of the spring and the first-mentioned part of the casing, a backing ratchet connection between the two parts of the casing, and a main clutch between the last-mentioned part of the casing and the driven shaft.

2. A driving shaft, a driven shaft, gearing interposed between the said shafts and including a two-part casing, one of which parts is connected with the driving shaft, a starting clutch to engage said part of the casing, a spring having one end connected with said clutch and its opposite end with the other part of the casing, and a clutch between said other part of the casing and the driven shaft.

3. A driving shaft, a driven shaft, gearing connecting said shafts and including a two-part casing, one of which parts is connected with the driving shaft, and a starting clutch adapted to engage said part of the casing, a spring having one end connected with said clutch and its opposite end with the other member of the casing, said two members of the casing forming an inclosure within which the spring is located, and a clutch between said other part of the casing and the driven shaft.

4. A driving shaft, a driven shaft, gearing interposed between the said shafts and including a two-part casing, one of which parts is connected with the driving shaft, a starting clutch to engage said member of the casing, a spring having one end connected with said clutch and its opposite with the other part of the casing, and a clutch between said other part of the casing and the driven shaft, said clutch forming a closure for the opening into the casing.

5. A driving shaft, a driven shaft, gearing interposed between said shafts and including a two-part casing, one of which parts is rigidly connected with the driving shaft thereby constituting a fly-wheel, a starting clutch to engage said member of the casing, a spring having one end connected with said clutch and its opposite end with the other part of the casing, and a clutch between said other part of the casing and the driven shaft.

6. A shaft connected with a motor, a drum secured to said shaft, a starting clutch member adapted to engage said drum, a spring connected with said starting clutch member, a main clutch mounted within the drum and having one of its members connected with said spring and the other with the driven mechanism, and means for independently operating each of the clutches.

7. A shaft connected with a motor, a drum secured to said shaft, a starting clutch member adapted to engage said drum, a spring connected with said starting clutch member, a main clutch mounted within the drum and having one of its members connected with said spring and the other with driven mechanism, a spring interposed between the movable members of the starting and main clutches, and means for independently operating each of the clutches.

8. A shaft connected with a motor, a drum secured to said shaft and constituting a portion of a starting clutch, a starting clutch member mounted for longitudinal reciprocation upon said shaft, a winding spring connected with a member of the starting clutch, a main clutch member mounted within the drum and having one of its parts connected with said spring and the opposite part connected with driven mechanism, means for independently operating said clutches, means for preventing rotation of a starting clutch member under the influence of the spring, and means for connecting a member of the main clutch with said drum.

9. A shaft connected with a motor, a drum secured to said shaft and constituting one member of a starting clutch, a starting clutch member mounted on the shaft, means for operating said clutch members, a main clutch mounted within the drum, means for operating the main clutch members, a winding spring having its inner end connected with a starting clutch member and its outer end connected with a main clutch member, means for connecting a main clutch member with said drum, and means for holding a starting clutch member against rotation.

10. A shaft connected with a motor, a drum secured to said shaft and constituting one member of a starting clutch, a starting clutch member mounted upon the shaft, means for operating the starting clutch, a main clutch, a winding spring having one end connected to a member of the starting clutch and its opposite end to a member of the main clutch, a ratchet and pawl connection between the main clutch and said drum, and means for independently operating said clutches.

11. A shaft connected with a motor, a drum secured to said shaft and constituting one member of a starting clutch, a starting clutch member mounted upon the shaft and having a starting disk with teeth thereon, a main clutch, a winding spring having one end connected to a starting clutch member and its opposite end connected to a main clutch member, means for operating the main clutch, starting levers arranged to engage the teeth of the starting disk to hold the starting clutch member against rotation, and means for operating the starting levers.

12. A shaft connected with a motor, a drum secured to said shaft and constituting one member of a starting clutch, a starting clutch member mounted upon the shaft and having a starting disk with teeth thereon, a main clutch, a winding spring having one end connected to a starting clutch member and its opposite end connected to a main clutch member, means for operating the main clutch, a disk for operating the starting clutch, said disk having teeth, and starting levers arranged to engage the teeth of the starting disk and of said operating disk to hold the starting clutch member against rotation.

CHARLES E. REDDIG.

Witnesses:
ARTHUR B. JENKINS,
D. I. KREIMENDAHL.